United States Patent
Kumoi

(10) Patent No.: US 10,350,687 B2
(45) Date of Patent: Jul. 16, 2019

(54) CUTTING INSERT HAVING OUTWARDLY INCLINED SIDE SURFACE AND INWARDLY INCLINED LOWER SURFACE, AND ROTARY CUTTING TOOL

(71) Applicant: TUNGALOY CORPORATION, Fukushima (JP)

(72) Inventor: Haruki Kumoi, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 89 days.

(21) Appl. No.: 15/515,771

(22) PCT Filed: Oct. 15, 2015

(86) PCT No.: PCT/JP2015/079146
§ 371 (c)(1),
(2) Date: Mar. 30, 2017

(87) PCT Pub. No.: WO2016/060195
PCT Pub. Date: Apr. 21, 2016

(65) Prior Publication Data
US 2017/0304911 A1    Oct. 26, 2017

(30) Foreign Application Priority Data

Oct. 16, 2014   (JP) .................... 2014-211376

(51) Int. Cl.
*B23C 5/20* (2006.01)
*B23C 5/10* (2006.01)

(52) U.S. Cl.
CPC ............... *B23C 5/109* (2013.01); *B23C 5/20* (2013.01); *B23C 5/10* (2013.01); *B23C 5/202* (2013.01);
(Continued)

(58) Field of Classification Search
CPC .......... B23C 5/207; B23C 5/202; B23C 5/20; B23C 5/109; B23C 2200/28;
(Continued)

(56) References Cited

U.S. PATENT DOCUMENTS

| 4,621,955 | A | * | 11/1986 | Briese | ..................... | B23B 27/10 |
| | | | | | | 407/103 |
| 5,447,396 | A | * | 9/1995 | Pantzar | ................... | B23C 5/207 |
| | | | | | | 407/113 |

(Continued)

FOREIGN PATENT DOCUMENTS

| CN | 1228045 A | 9/1999 | |
| WO | WO-2010067910 A1 | * 6/2010 | ........... B23C 5/2221 |

OTHER PUBLICATIONS

International Search Report dated Nov. 24, 2015 issued in International (PCT) Application (No. PCT/JP2015/079146).

(Continued)

*Primary Examiner* — Ryan C Rufo
(74) *Attorney, Agent, or Firm* — Studebaker & Brackett PC

(57) ABSTRACT

A cutting insert has opposing first and second end surfaces, and a peripheral side surface (connecting the end surfaces. A central axis penetrates the two end surfaces. The peripheral sure surface includes an outwardly inclined first side surface part related to a major cutting edge and a second side surface part related to a minor cutting edge. The outwardly inclined first side surface part gradually extends outward from the cutting insert, heading from the first end surface to the second end surface. When a second virtual plane, which is substantially perpendicular to the central axis and passes through the major cutting edge, is defined, an inwardly inclined part, on a back side of the cutting edge, of the second end surface is inclined so as to become more distant (Continued)

from the second virtual plane, heading from the outwardly inclined first side surface part to the central axis.

9 Claims, 14 Drawing Sheets

(52) U.S. Cl.
CPC .......... *B23C 5/207* (2013.01); *B23C 2200/12* (2013.01); *B23C 2200/125* (2013.01); *B23C 2200/164* (2013.01); *B23C 2200/28* (2013.01)

(58) Field of Classification Search
CPC .......... B23C 2200/283; B23C 2200/16; B23C 2210/0435
See application file for complete search history.

(56) References Cited

U.S. PATENT DOCUMENTS

| | | | | |
|---|---|---|---|---|
| 5,622,460 | A * | 4/1997 | Satran | B23C 5/1045 407/42 |
| 5,853,267 | A | 12/1998 | Satran et al. | |
| 6,293,737 | B1 * | 9/2001 | Satran | B23C 5/2221 407/113 |
| 8,696,254 | B2 | 4/2014 | Satran | |
| 8,858,127 | B2 | 10/2014 | Satran et al. | |
| 9,682,433 | B2 * | 6/2017 | Choi | B23C 5/06 |
| 2008/0181737 | A1 * | 7/2008 | Limell | B23B 27/1614 408/188 |
| 2010/0150671 | A1 * | 6/2010 | Oprasic | B23C 5/207 407/42 |
| 2011/0236143 | A1 | 9/2011 | Ryu | |
| 2013/0108388 | A1 * | 5/2013 | Ishi | B23C 5/109 409/132 |
| 2013/0115022 | A1 * | 5/2013 | Ishi | B23C 5/109 409/132 |
| 2013/0156515 | A1 * | 6/2013 | Satran | B23C 5/207 407/48 |
| 2014/0205388 | A1 * | 7/2014 | Hedberg | B23C 5/207 407/42 |
| 2015/0016900 | A1 | 1/2015 | Jansson | |

OTHER PUBLICATIONS

Written Opinion dated Nov. 24, 2015 issued in International (PCT) Application (No. PCT/JP2015/079146).

* cited by examiner

US 10,350,687 B2

CUTTING INSERT HAVING OUTWARDLY INCLINED SIDE SURFACE AND INWARDLY INCLINED LOWER SURFACE, AND ROTARY CUTTING TOOL

RELATED APPLICATIONS

This is a 371 US National Phase of International Patent Application No. PCT/JP2015/079146, filed Oct. 15, 2015 and published as WO 2016/060195A1 on Apr. 21, 2016, which claims priority to Priority to JP 2014-211376, filed Oct. 16, 2014. The contents of the aforementioned applications are incorporated by reference in their entirety.

TECHNICAL FIELD

The present invention relates to a cutting insert and an indexable rotary cutting tool on which such cutting insert is removably mounted.

BACKGROUND ART

In the field of indexable rotary cutting tools, the development of a tool having a significantly small tool diameter compared with the prior art has been desired with the aim of precisely machining a mold, etc. Such rotary cutting tool having a small diameter is generally an end mill, and the required tool diameter is as small as approximately 20 mm or less. When a conventional indexable end mill is merely reduced in terms of its diameter, the resultant diameter is extremely small as described above, which leads to a thin thickness of a back metal portion thereof, which is adjacent to a back part, with respect to a tool rotating direction, of an insert mounting seat on which a cutting insert is mounted. A back metal portion of a tool body is a portion which receives the cutting resistance applied on a cutting insert, and thus, if such portion is thin, this easily invites the generation of chattering in the cutting insert during machining. As a result, chattering easily leads to the occurrence of issues including a reduction in the quality of a surface to be machined and fracturing of a cutting insert. Conventionally, in order to solve such problems, the thickness of a back metal portion has been devised to be secured. For example, as viewed from a leading end surface side of a tool, a cutting insert is arranged such that a radial rake angle is negative while the position of a cutting corner involved in cutting is kept unchanged, whereby a back metal portion in an insert mounting seat of a tool body can be made thick.

However, when a cutting insert is arranged such that a radial rake angle is negative as described above, a bottom wall surface of an insert mounting seat faces toward an outer periphery of the tool. Thus, the cutting resistance applied on a major cutting edge which extends in a substantially axial direction on the outer periphery side of the tool causes the force received by the cutting insert to strongly include a component directed toward the outer periphery of the tool. Therefore, the cutting insert is prone to slide toward the outer periphery of the tool, which has resulted in the possibility of a reduction in the fixing property.

An example of means for solving the above problem is a method in which a lower surface of a cutting insert is formed in a convex manner so as to have a substantially V shape, as disclosed in Patent Document 1. The lower surface of the cutting insert in Patent Document 1 has a flat base surface extending in a longitudinal direction and two inclined surfaces which respectively extend outward from the sides of the base surface toward an upper surface of the cutting insert. This cutting insert is mounted on a tool body such that the base surface located at a peak portion of the V shape has a positional relationship so as to be substantially parallel to a rotational axis of the tool body. This allows an inclined surface located on the outer periphery side of the tool, from among the two inclined surfaces constituting the V shape, to receive a force directed toward the outer periphery of the tool, which suppresses shifting of the cutting insert toward the outer periphery of the tool.

CITATION LIST

Patent Document

Patent Document 1: JP2012-510380 T

SUMMARY

Technical Problem

However, the cutting insert of Patent Document 1 has had the problem set forth below. That is, when the lower surface of the cutting insert is formed in a substantially V shape, a combination of factors, such as cutting resistance and centrifugal force applied on the cutting insert and elastic deformation of an insert mounting seat, causes an inner-periphery-side inclined surface located on the inner periphery side of the tool, from among the two inclined surfaces of the lower surface, to be distant from a bottom wall surface of the insert mounting seat, which may substantially lead to the occurrence of a situation where the cutting insert is supported by only an outer-periphery-side inclined surface located on the outer periphery side of the tool. In such situation, entire cutting resistance would entirely be supported by only the outer-periphery-side inclined surface located on the outer periphery side of the tool, and thus, the fixing property of the cutting insert is reduced, and this is likely to lead to the occurrence of the issues of chattering, etc.

The present invention has been made in light of the above problem, and an object of the present invention is to provide a cutting insert which has excellent fixing property and also comprises a substantially V-shaped lower surface, and an indexable rotary cutting tool on which such cutting insert is mounted.

Solution to Problem

A first aspect of the present invention provides a cutting insert comprising a first end surface, a second end surface opposing the first end surface and a peripheral side surface connecting the first end surface and the second end surface, and having an axis defined so as to penetrate the first end surface and the second end surface, wherein:

at least one cutting edge is formed along an intersecting edge between the first end surface and the peripheral side surface, and each cutting edge is provided with a major cutting edge and a minor cutting edge which are connected via a corner cutting edge;

the peripheral side surface has a first side surface part related to the major cutting edge and a second side surface part related to the minor cutting edge;

when a first virtual plane which is substantially parallel to the axis and is along the major cutting edge is defined, the first side surface part is formed so as to gradually become more distant from the first virtual plane, outward from the cutting insert, heading from the first end surface to the second end surface;

the second end surface has an inclined part on a back side of the cutting edge; and when a second virtual plane which is substantially perpendicular to the axis and passes through the major cutting edge is defined, the inclined part is inclined so as to become more distant from the second virtual plane, heading from the first side surface part to the axis.

With the cutting insert having the above configuration according to the first aspect of the present invention, the first side surface part relating to the major cutting edge extends outward from the insert, heading from the first end surface to the second end surface, and thus, the inclined part can be expanded. Therefore, the inclined part of the second end surface can firmly come into contact, via a sufficiently wide contact area, with a bottom wall surface of an insert mounting seat of a tool body of a cutting tool. This significantly improves the fixing property, which makes it possible to remarkably suppress the occurrence of chattering, etc.

Preferably, the clearance angle of the first side surface part is within a range of −20° or more and −10° or less.

Preferably, in the second side surface part, the clearance angle of a portion thereof which serves as a flank with regard to the minor cutting edge is a positive angle.

Preferably, the number of cutting edges formed along an intersecting edge between the first end surface and the peripheral side surface is n (where n is an integer of 2 or higher), and the cutting insert has a shape of n-fold rotational symmetry around the axis.

Preferably, two cutting edges (E) are formed along the intersecting edge between the first end surface and the peripheral side surface, two inclined parts which constitute a substantially V shape are formed in the second end surface, and an interior angle formed by the inclined parts or respective extension planes thereof is within a range of 140° or more and 160° or less.

Preferably, all of the first side surface parts have equal clearance angles.

Preferably, all of the inclined parts have equal inclination angles.

A second aspect of the present invention provides an indexable rotary cutting tool, having a rotational axis and comprising a tool body provided with at least one insert mounting seat, the insert mounting seat having a cutting insert being removably mounted thereon, wherein the cutting insert is the above-described cutting insert.

Preferably, the cutting insert itself is mounted on the tool body such that a radial rake angle is within a range of −40° or more and −30° or less.

Preferably, the major cutting edge of an active cutting edge extends, on an outer periphery side of the tool, substantially in a direction of a rotational axis, and an inclined part, which is located on a back side of the major cutting edge of the active cutting edge, is contacted by an outer-periphery-side inclined bottom wall surface of a bottom wall surface of the insert mounting seat.

DESCRIPTION OF EMBODIMENTS

Figure 1:
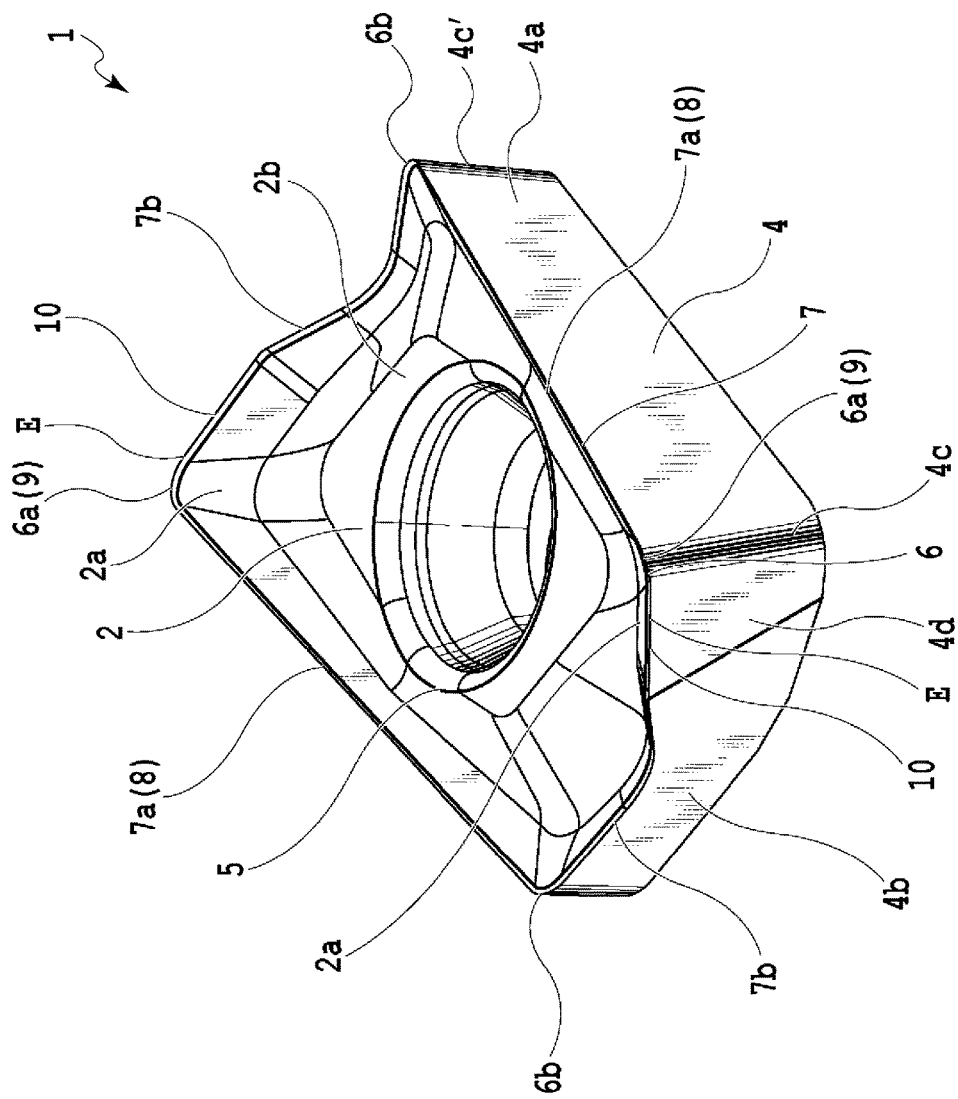
FIG. 1 is a perspective view of a cutting insert according to an embodiment of the present invention.

Embodiments of the present invention will now be described in detail with reference to the attached drawings. Expressions such as "upper," "lower," "front" and "back" may be used in the following description. However, such expressions are merely used to aid in easier understanding of the description and are not intended to limit the present invention.

As shown in FIGS. 1 to 6B, a cutting insert 1 of the present embodiment has a substantially quadrangular plate shape. The cutting insert 1 is basically configured by a first end surface 2 having a substantially quadrangular shape, a second end surface 3 arranged so as to oppose the first end surface 2 and a peripheral side surface 4 connecting the first end surface 2 and the second end surface 3. A mounting hole 5, which defines a central axis O, is provided so as to penetrate substantially a center part of the first end surface 2 and substantially a center part of the second end surface 3. This central axis O is originally a central axis of the cutting insert 1. In the present embodiment, the central axis of the cutting insert 1 matches a central axis of the mounting hole 5. However, the configuration is not limited thereto. In other words, the central axis O can also be defined in a configuration which does not comprise the mounting hole 5. The cutting insert 1 is configured so as to be of 180-degree rotational symmetry around the central axis O. It should be noted that, as is apparent from the description below, the cutting insert comprises cutting edges only on the first end surface side, and thus, the first end surface and the second end surface may merely be referred to respectively as an upper surface and a lower surface.

As viewed from a direction facing the first end surface 2 (i.e., in FIG. 2), the first end surface 2 constitutes a substantially quadrangular shape including four curved corners 6 and four sides 7 formed between the corners 6. The four sides 7 are constituted by two long sides 7a and two short sides 7b. The pair of long sides 7a are opposed to each other, and the pair of short sides 7b are also arranged so as to be opposed to each other. Further, the four corners 6 are constituted by two corners which are involved in cutting (cutting corners) 6a and two corners which are not involved in cutting 6b. The corners 6a, which are involved in cutting, and the corners 6b, which are not involved in cutting, are alternately arranged with the long sides 7a or the short sides 7b interposed therebetween. Therefore, the first end surface 2 of the cutting insert 1 of the present embodiment constitutes a substantially quadrangular shape of 180-degree rotational symmetry about the central axis O in FIG. 2. However, in the present invention, the shape is not limited thereto, and the cutting insert may have another shape, such as a triangular shape or a pentagonal shape. The peripheral side surface 4 is constituted by a first side surface part (long side surface part) 4a which is adjacent to each long side 7a, a second side surface part (short side surface part) 4b which is adjacent to each short side 7b, a third side surface part (corner side surface part) 4c which is adjacent to each corner 6a, and a corner side surface part 4c' which is adjacent to each corner 6b, and these surface parts are continuous with one another in the circumferential direction. The shapes and sizes of these surfaces may be changed as appropriate. It should be noted that, since the cutting insert 1 is configured so as to be of 180-degree rotational symmetry around the central axis O, the two first side surface parts 4a are opposed to each other, and the two second side surface parts 4b are opposed to each other.

An intersecting edge between the first end surface 2 and the peripheral side surface 4 is provided with a plurality of cutting edges E. Since, as described above, the cutting insert 1 is of 180-degree rotational symmetry about the central axis O, the intersecting edge between the first end surface 2 and the peripheral side surface 4 is, to be more precise, provided with two cutting edges E. Each cutting edge E is constituted by a major cutting edge 8, a corner cutting edge 9 and a minor cutting edge 10. The major cutting edge 8 is formed through an intersecting edge between the first end surface 2 and the first side surface part 4a (an intersecting edge corresponding to the long side 7a). In other words, the major cutting edge 8 extends between the two corners adjacent to each other, i.e., the corner 6a and the corner 6b. The corner cutting edge 9 is formed through an intersecting edge between the first end surface 2 and the third side surface part 4c (an intersecting edge corresponding to the cutting corner 6a). One of the ends of the corner cutting edge 9 is connected to one of the ends of the major cutting edge 8. The minor cutting edge 10 is formed along part of an intersecting edge between the first end surface 2 and the second side surface part 4b (an intersecting edge corresponding to the short side 7b). In other words, the minor cutting edge 10 is formed between the two adjacent corners, i.e., the corner 6a and the corner 6b, so as to cover a position which is separate, by a certain distance, from the corner 6a, in a direction toward the corner 6b, and such minor cutting edge 10 is therefore not connected to the corner 6b. One of the ends of the minor cutting edge 10 is connected to the end of the corner cutting edge 9 which is different from the end thereof which is connected to the major cutting edge 8. Therefore, in the present embodiment, the major cutting edge 8, the corner cutting edge 9 and the minor cutting edge 10 are connected to one another in this order. Further, in the intersecting edge between the first end surface 2 and the second side surface part 4b, an inner cutting edge may be formed between the minor cutting edge 10 and the cutting corner 6b. An inner cutting edge is a cutting edge used in pocketing, including ramping, etc.

Figure 3:
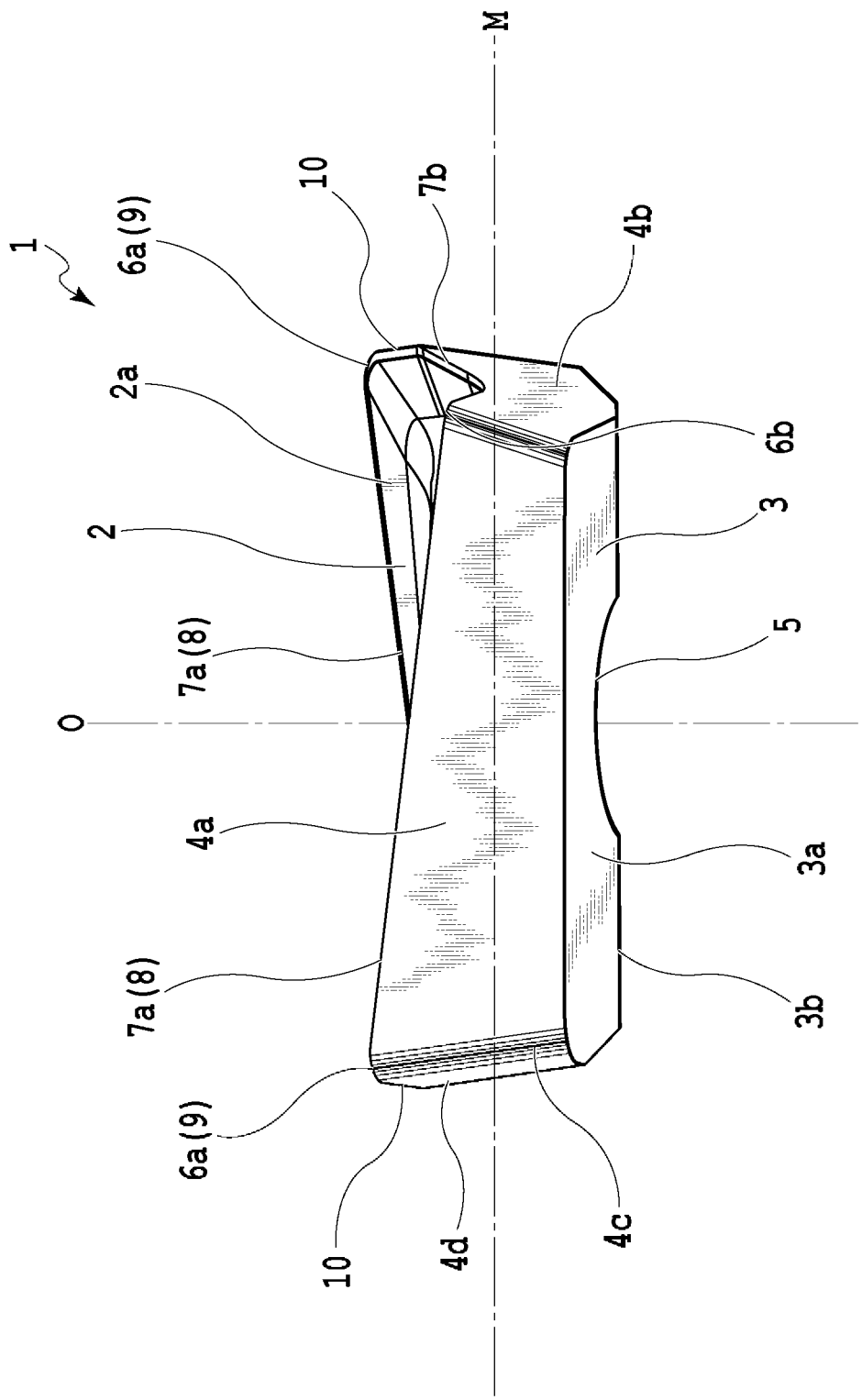
FIG. 3 is a side view of the cutting insert of FIG. 1, the view seen from a long side surface part side.
Figure 4:
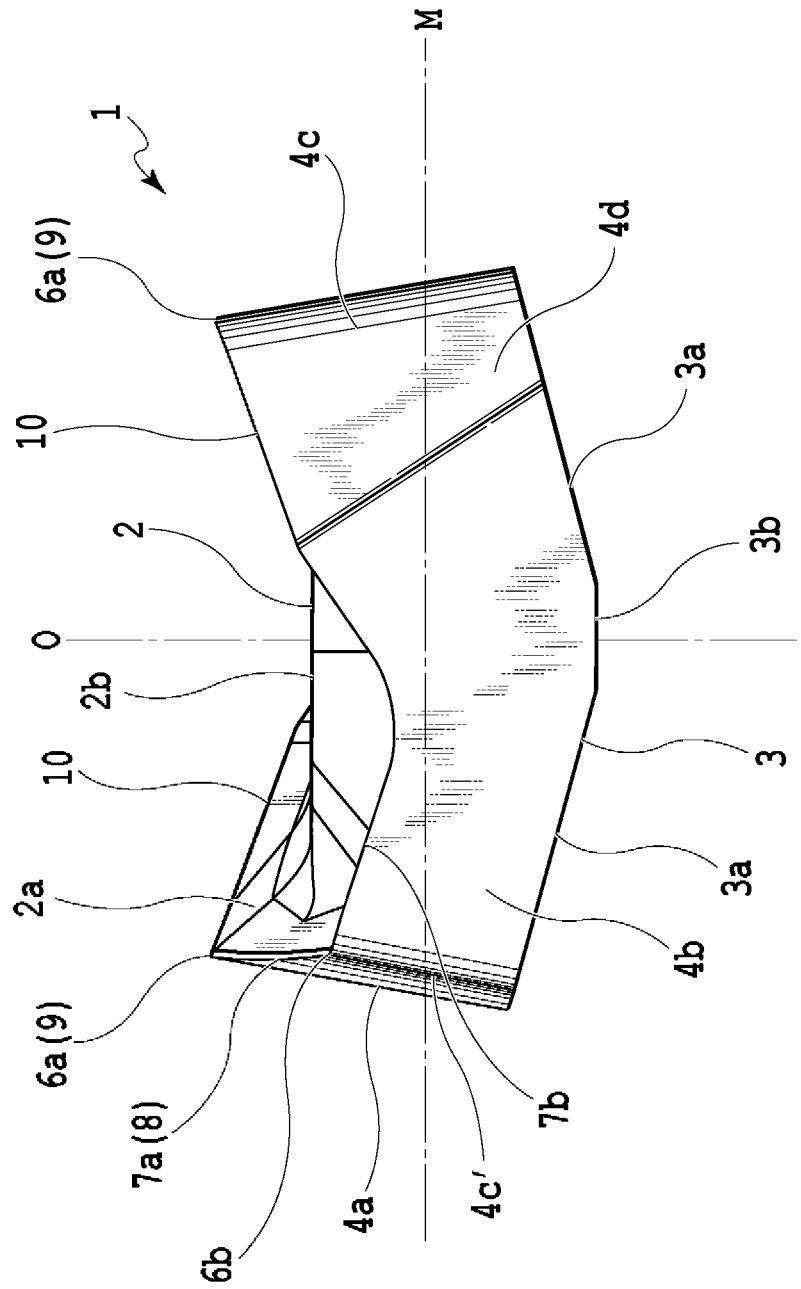
FIG. 4 is a side view of the cutting insert of FIG. 1, the view seen from a short side surface part side.
Figure 5:
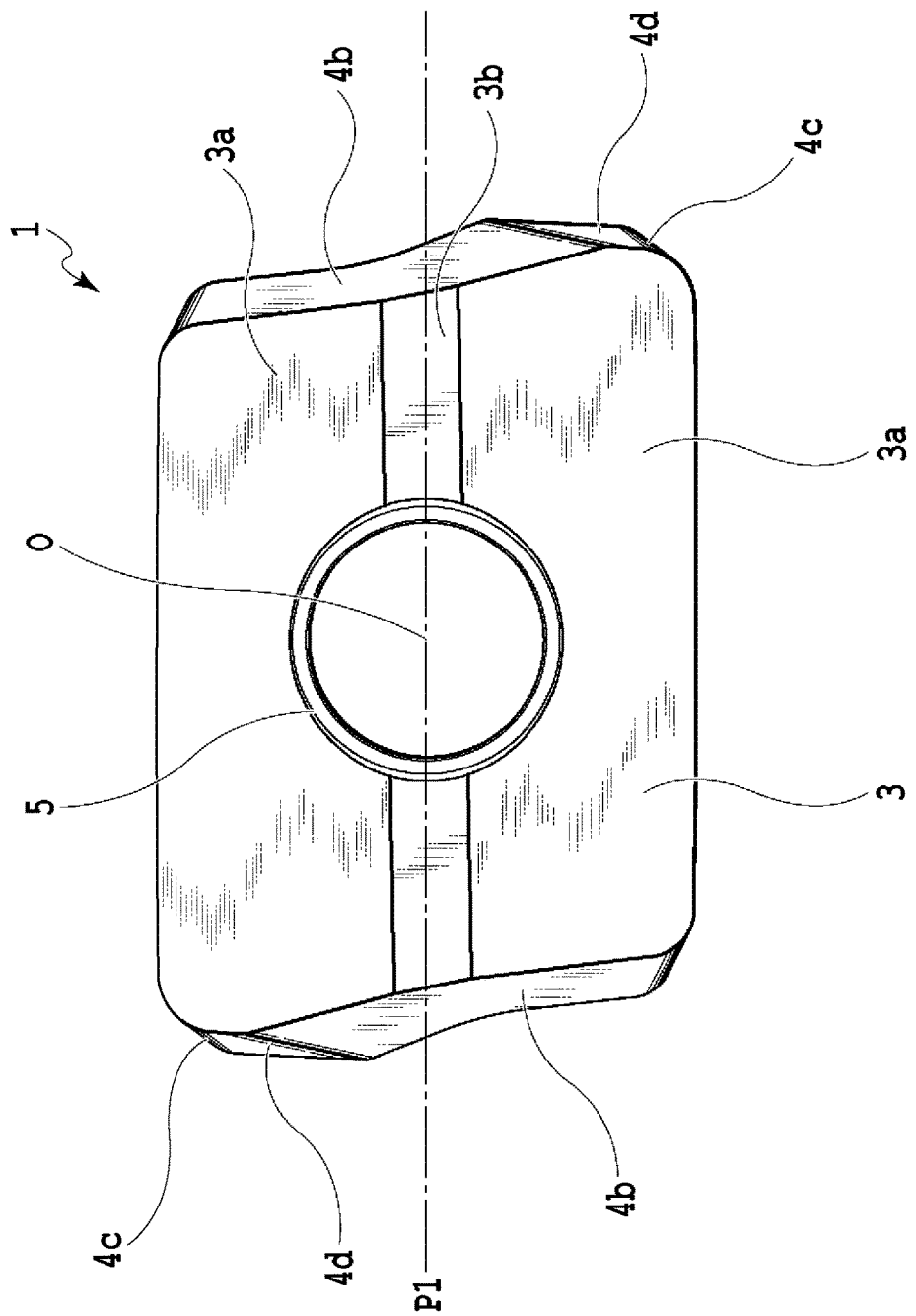
FIG. 5 is a bottom view of the cutting insert of FIG. 1.

FIG. 3, being a side view in which the cutting insert 1 is viewed from a side facing the first side surface part 4a leading to the major cutting edge 8, and FIG. 4, being a side view in which the cutting insert 1 is viewed from a side facing the second side surface part 4b leading to the minor cutting edge 10, are referred to herein. As shown in FIGS. 3 and 4, a plane which penetrates the peripheral side surface 4 and perpendicularly intersects with the central axis O is defined between the first end surface 2 and the second end surface 3, and such plane is defined as an intermediate plane M. The major cutting edge 8 is formed such that a distance thereof from the intermediate plane M changes between the two corners, i.e., the corner 6a and the corner 6b. More specifically, in FIG. 3, the major cutting edge 8 linearly extends such that part thereof gradually becomes closer to the second end surface 3 with respect to the first end surface 2 (i.e., gradually becomes closer to the intermediate plane M), heading from the corner 6a to the corner 6b. The major cutting edge 10 is also formed such that a distance thereof from the intermediate plane M changes between the two corners, i.e., the corner 6a and the corner 6b. More specifically, in FIG. 4, the minor cutting edge 10 linearly extends such that part thereof gradually becomes closer to the second end surface 3 with respect to the first end surface 2 (i.e., gradually becomes closer to the intermediate plane M), heading from the corner 6a to the corner 6b. As described above, it should be noted that the minor cutting edge 10 is formed in part of the short side 7b rather than being formed in the entire short side 7b. The corner cutting edge 9 extends so as to smoothly connect its adjacent major cutting edge 8 and its adjacent minor cutting edge 10. Therefore, in the cutting edge E, the corner cutting edge 9 serves as a cutting edge portion most distant from the intermediate plane M with respect to an insert thickness direction being a direction parallel to the central axis O. In the cutting insert 1 of the present embodiment, the respective cutting edge portions 8, 9, 10 have the above-described shapes. However, the shapes are not limited thereto in the present invention, and the respective cutting edges 8, 9, 10 may also have other shapes.

In an indexable rotary cutting tool 11, which will be described below, the major cutting edge 8 is a cutting edge having a function of cutting a machined side surface of a workpiece. The minor cutting edge 10 is a cutting edge having a function of cutting a machined bottom surface of a workpiece. The corner cutting edge 9 is a cutting edge having a function of cutting a corner located between a machined side surface of a workpiece and a machined bottom surface thereof. The cutting insert 1 of the present embodiment is a cutting insert in which the major cutting edge 8 and the minor cutting edge 10 intersect substantially perpendicularly to each other in the plan view of FIG. 2, i.e., a cutting insert of a type which is capable of performing so-called square shoulder milling. However, the present invention is not limited thereto.

Figure 6A:
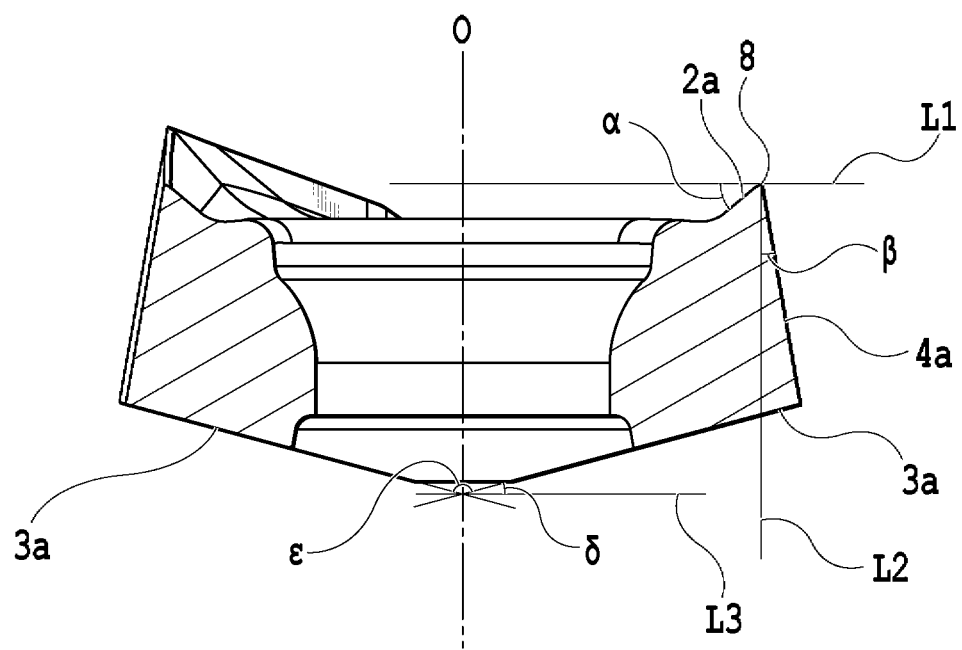
FIG. 6A is a cross-sectional view of the cutting insert of FIG. 1, the view taken along a VIA-VIA line of FIG. 2.

Part of the first end surface 2 functions as a rake surface 2a with regard to the relevant cutting edge E (a set of cutting edge portions 8, 9, 10). The rake surface 2a is a portion of the first end surface 2 which is adjacent to the respective cutting edge portions 8, 9, 10, and such rake surface 2a serves as an inclined surface in which part thereof which is more distant from the cutting edges 8, 9, 10 gradually becomes closer to the intermediate plane M. More specifically, as shown in FIG. 6A, the rake surface 2a is given a positive angle as a rake angle $\alpha$. Herein, the rake angle $\alpha$ refers to an intersection angle between a virtual plane L1, which is defined so as to be perpendicular to the central axis O and to pass through any point of the major cutting edge 8, and the rake surface 2a. In particular, this rake angle may be defined in a cross-section taken along a line defined so as to be orthogonal to the cutting edge in FIG. 2, and such cross-section is shown in FIG. 6A. In FIG. 6A, a rake angle when the rake surface 2a is located below the virtual plane L1 (inside the insert) is regarded as being positive. For example, the rake angle α may be from 40° to 50° and is set at approximately 45° in the present embodiment. However, the present invention is not limited to such angle, and the rake angle may be changed as appropriate according to the circumstances. It should be noted that, in the cutting insert 1, a rake angle is generally constant through a cutting edge but may be variable. Further, a flat top surface 2b (which extends so as to be orthogonal to the central axis O) is formed around the mounting hole 5 of the first end surface 2. In other words, the rake surface 2a extends between the cutting edge E and the top surface 2b.

Part of the peripheral side surface 4 functions as a flank with regard to the relevant cutting edge E (a set of the cutting edge portions 8, 9, 10). More specifically, the first side surface part 4a adjacent to the major cutting edge 8 entirely functions as a flank. As to the second side surface part 4b adjacent to the minor cutting edge 10, not the whole of such second side surface part 4b but only a portion 4d thereof which is directly connected to the minor cutting edge 10 substantially functions as a flank. The third side surface part 4c adjacent to the corner cutting edge 9 entirely functions as a flank.

When viewed from a direction facing the second side surface part 4b (i.e., in FIG. 4), the first side surface part 4a, which functions as the flank of the major cutting edge 8, is outwardly inclined from the first end surface 2. In other words, the first side surface part 4a is inclined so as to gradually become more distant from the central axis O (and thus also from the vertical plane P1), heading from the first end surface 2 to the second end surface 3. More specifically, as shown in FIG. 6A, the first side surface part 4a is formed such that a clearance angle β thereof is negative. Herein, the clearance angle β concerning the major cutting edge 8 refers to an intersection angle between a virtual plane L2, which is defined so as to be parallel to the central axis O and to be along the major cutting edge 8, and the first side surface part 4a. In particular, this clearance angle may be defined in a cross-section taken along a line defined so as to be orthogonal to the cutting edge in FIG. 2, and may be defined in, for example, FIG. 6A. In FIG. 6A, a clearance angle when the first side surface part 4a is located inside the vertical plane L2 is regarded as being positive. In the case of the present embodiment, the clearance angle β is a negative angle. Thus, the first side surface part 4a can be said to be formed so as to gradually become more distant from the virtual plane L2, outward from the cutting insert, heading from the first end surface 2 to the second end surface 3. For example, the clearance angle β concerning the major cutting edge 8 may be from −5° to −20°, and may preferably be from −10° to −20° (within a range of −20° or more and −10° or less). In the case of the present embodiment, the clearance angle β is set at approximately −15°. However, in the present invention, the clearance angle β concerning the major cutting edge is not limited to the above angle and may be changed as appropriate according to the circumstances.

Figure 2:
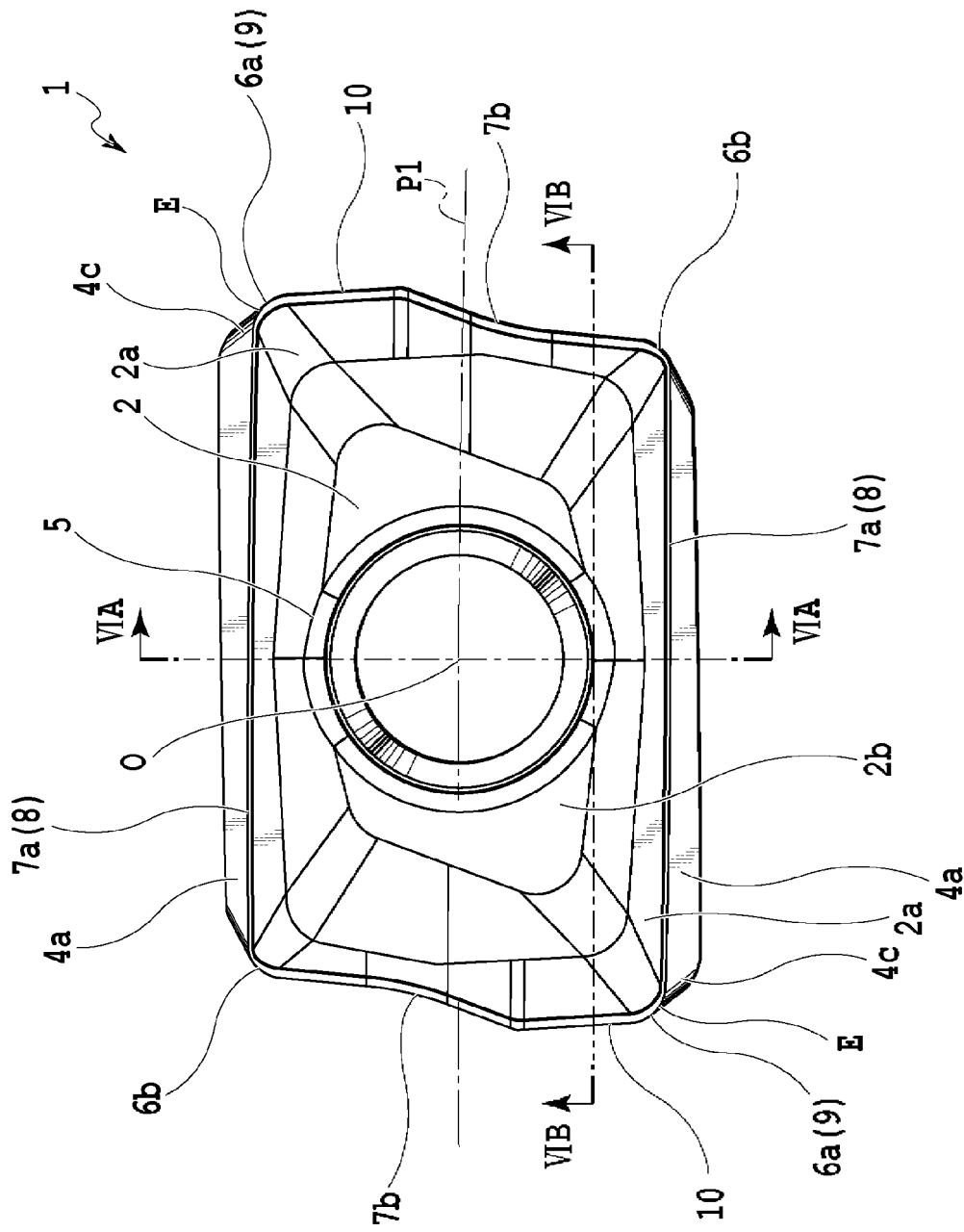
FIG. 2 is a plan view of the cutting insert of FIG. 1.
Figure 6B:
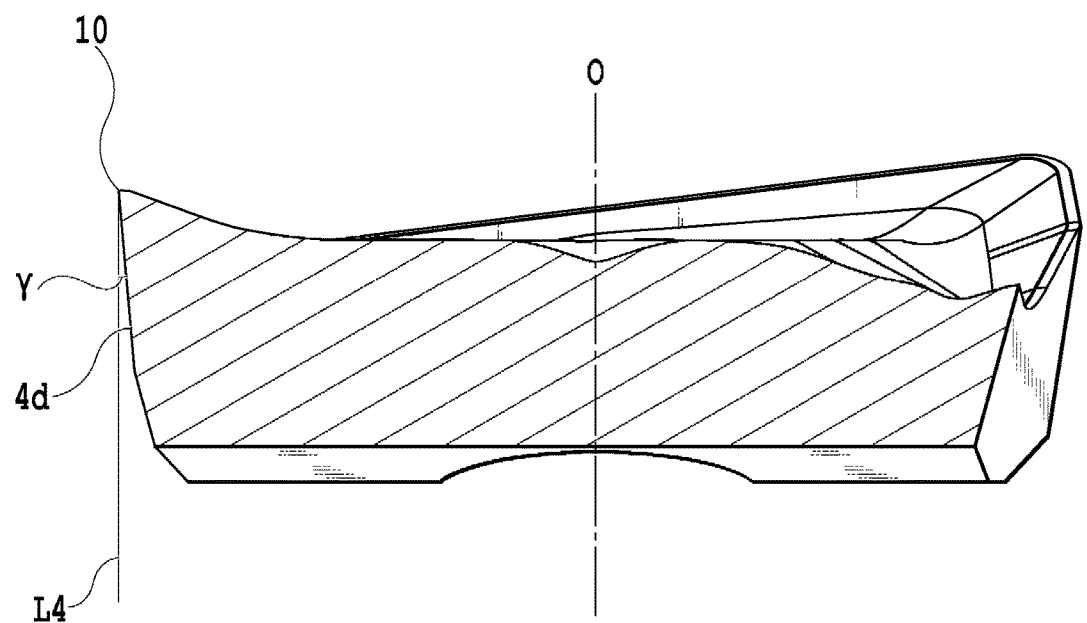
FIG. 6B is a cross-sectional view of the cutting insert of FIG. 1, the view taken along a VIB-VIB line of FIG. 2.
Figure 7:
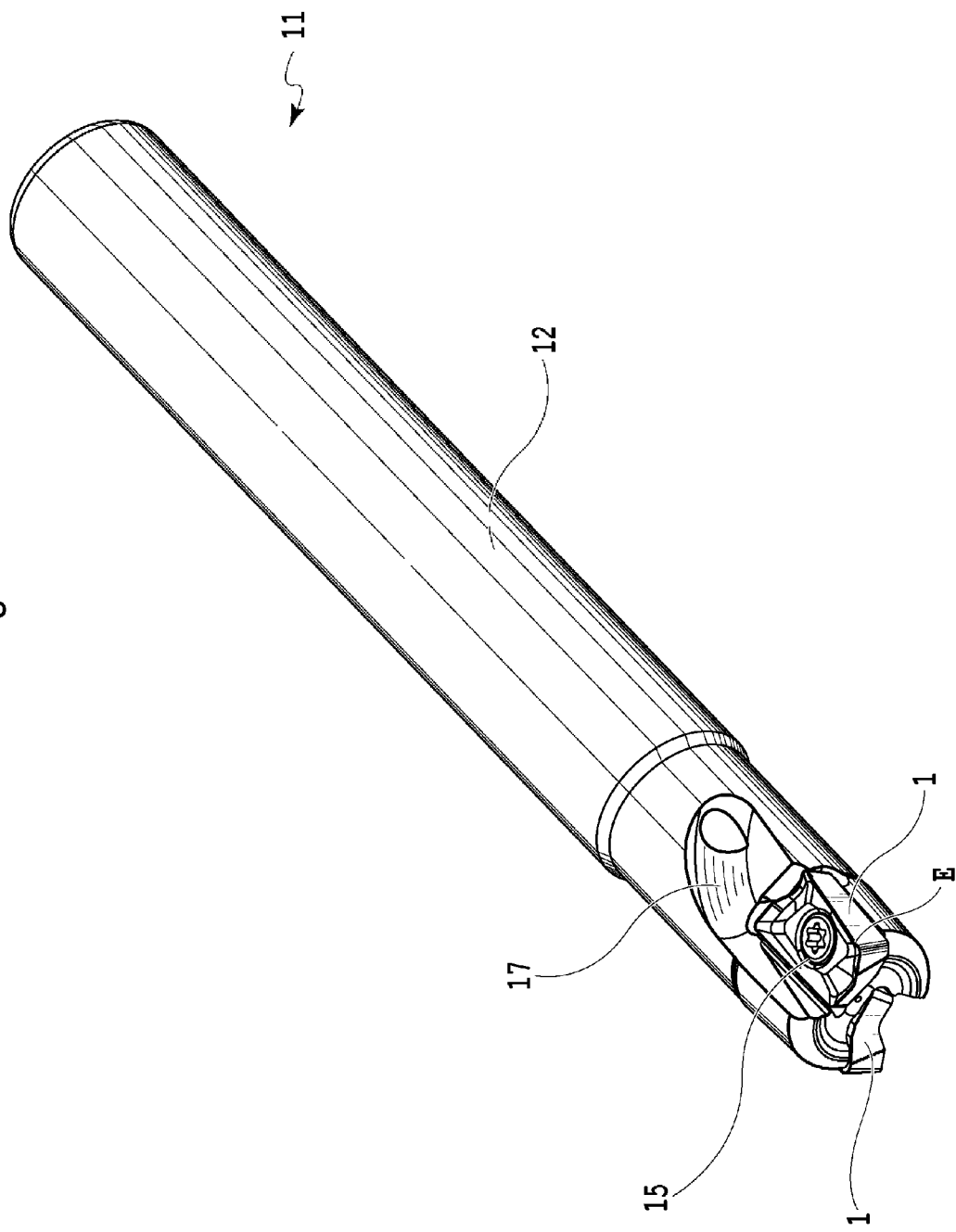
FIG. 7 is a perspective view of an indexable rotary cutting tool on which the cutting insert of FIG. 1 is removably mounted according to an embodiment of the present invention.

On the other hand, as shown in FIG. 6B, the second side surface part 4b, which has the portion 4d that functions as a flank of the minor cutting edge 10, is inclined so as to gradually become closer to the central axis O, heading from the first end surface 2 to the second end surface 3. In other words, in the second side surface part 4b, the portion 4d thereof, which functions as a flank, is formed such that a clearance angle γ thereof is positive. Herein, the clearance angle γ concerning the minor cutting edge 10 refers to an intersection angle between a virtual plane L4, which is defined so as to be parallel to the central axis O and to be along the minor cutting edge 10, and the flank portion 4d of the second side surface part 4b. In FIG. 2, the clearance angle γ may be defined in a cross-section taken along the line defined so as to be orthogonal to the cutting edge. In FIG. 6B, an angle when the flank portion 4d is located inside the vertical plane L4 is regarded as being positive. For example, the clearance angle γ concerning the minor cutting edge 10 may be a positive angle of from 0° to 10°, and is approximately 5° in the case of the present embodiment. Thus, in the second side surface part 4b, the portion 4d, which functions as a flank, can be said to be formed so as to gradually become more distant from the virtual plane L4, inward of the cutting insert, heading from the first end surface 2 to the second end surface 3. However, in the present invention, the clearance angle γ concerning the minor cutting edge is not limited to the above angle and may be changed as appropriate according to the circumstances. However, the clearance angle γ is preferably a positive angle.

Further, the third side surface part 4c, which functions as the flank of the corner cutting edge 9, is formed so as to have a clearance angle which is negative at a portion thereof located on the major cutting edge 8 side and is positive at a portion thereof located on the minor cutting edge 10 side, as can be understood from FIG. 2, etc. In other words, the third side surface part 4c has a portion where the clearance angle changes gradually in the circumferential direction such that the third side surface part 4c smoothly connects its adjacent side surface parts 4a, 4b.

In the second side surface part 4b, a portion of the part thereof which excludes the flank portion 4d functions as a restraining surface which comes into contact with the sidewall surface 14b of the insert mounting seat 13 provided in a tool body 12.

In the cutting insert 1 of the present embodiment, in the peripheral side surface 4, a portion thereof which is arranged so as to be adjacent to the major cutting edge 8 is configured only by the first side surface part 4a, but the present invention is not limited thereto. For example, another side surface part may be provided between the first end surface 2 and the first side surface part 4a or between the first side surface part 4a and the second end surface 3. In other words, in the peripheral side surface 4, a side surface portion thereof leading to the major cutting edge 8 may be formed such that a plurality of surface portions is connected to one another, heading from the first end surface 2 to the second end surface 3. However, any portion of the first side surface part 4a is required to have a negative clearance angle.

As shown in FIGS. 4 and 6A, the second end surface 3 has two inwardly inclined parts (or inwardly inclined surfaces) 3a, each of which gradually becomes more distant from a virtual plane L1 (or an intermediate plane M), heading from the first side surface part 4a to the central axis O (and thus also to the vertical plane P1). The two inclined parts 3a are respectively connected to the two first side surface parts 4a. Each inclined part 3a extends along the relevant major cutting edge so as to be located on a back side of such major cutting edge. A flat part 3b is formed between the two inclined parts 3a so as to connect such inclined parts 3a. In other words, the second end surface 3 has a configuration in which the flat part 3b is sandwiched between the two inclined parts 3a, and the second end surface 3 is projected outward and has a substantially V shape as viewed from the direction facing the second side surface part 4b. When defining a plane P1, which is substantially parallel to the long side 7a or the major cutting edge 8 and includes the central axis O in the plan view of FIG. 2, the flat part 3b is formed so as to extend along the plane P1 (in FIG. 5). The flat part 3b extends so as to be orthogonal to the central axis O. However, this flat part 3b is not an essential configuration. When viewed from a direction perpendicular to the central axis O relative to the second side surface part 4b (i.e., in FIG. 6A), each inclined part 3a has an inclination angle δ of approximately 15°, i.e., the two inclined parts 3a share the same angle. Herein, the inclination angle δ refers to an intersection angle between a virtual plane L3, which is perpendicular to the central axis O and passes through an intersection between extension planes of the two inclined parts 3a, and each inclined part 3a, and the inclination angle δ may be defined in a cross-section (for example, FIG. 6A) taken along a virtual plane defined so as to be orthogonal to the plane P1. In FIG. 6A, as to the inclination angle δ, an angle when the inclined part 3a is located above (i.e., inside) the vertical plane L3 is regarded as being positive. In the present embodiment, an interior angle ε, which is formed by the extension planes of the two inclined parts 3a, is approximately 150°. This interior angle ε is not limited to the above numerical value but is preferably within a range of 140° or more and 160° or less. Further, the second end surface 3 functions as a seating surface which comes into contact with a bottom wall surface 14a of the insert mounting seat 13 provided in the tool body 12. However, the configuration is such that, in practice, only the two inclined parts 3a come into contact with the bottom wall surface 14a and that the flat part 3b does not come into contact with the bottom wall surface 14a.

The cutting insert 1 can be made of hard materials, such as cemented carbide, cermet, ceramic, or an ultrahigh-pressure sintered body containing diamond or cubic boron nitride, or a material obtained by applying coating to these materials.

Next, the indexable rotary cutting tool 11 on which the cutting insert 1 of the above embodiment is removably mounted will be described with reference to FIGS. 7 to 12.

The indexable rotary cutting tool 11 of the present embodiment comprises the tool body 12. The tool body 12 extends in the longitudinal direction and has a rotational axis RA which extends from its leading end to its base end (along the longitudinal direction). Herein, the leading end refers to an end of the tool body 12 on which the cutting insert 1 is mounted while the base end refers to an end located on the opposite side. The indexable rotary cutting tool 11 is configured so as to be capable of being rotated forward, around the rotational axis RA, in a rotating direction K. It should be noted that the cutting tool 11 can be used by being rotated relative to a workpiece. The cutting tool itself may also be used by being rotated, or the workpiece itself may be used by being rotated.

The tool body 12 has, as its entire shape, a substantially cylindrical shape which extends along the rotational axis RA. The leading end of the tool body 12 is provided with a plurality of insert mounting seats 13. Although two insert mounting seats 13 are formed in the tool body 12 of the present embodiment, the number of the insert mounting seats 13 may be one or three or higher. Each insert mounting seat 13 is formed so as to be opened forward in the rotating direction K around the rotational axis RA and to be opened toward the leading end and toward the outer periphery.

The insert mounting seat 13 comprises the bottom wall surface 14a which is capable of coming into contact with each of the two inclined parts 3a of the second end surface 3 of the cutting insert 1 and the side wall surface 14b which is capable of coming into contact with a portion of the second side surface part 4b which excludes the third side surface part 4c in the cutting insert 1. The bottom wall surface 14a has two divided inclined bottom wall surfaces 14a', 14a". Each of these bottom wall surfaces 14a', 14a" is configured so as to come into contact with the corresponding one of the two inclined parts 3a of the cutting insert 1. Therefore, an angle formed by extension planes of the inclined bottom wall surfaces 14a', 14a" is substantially equal to the angle ε formed by the extension planes of the inclined parts 3a of the cutting insert 1. A recessed part (i.e., a circular-arc-shaped recess) is provided between the two inclined bottom wall surfaces 14a', 14a". Each of the inclined bottom wall surfaces 14a', 14a" basically have a shape equal to the inclined part 3a of the cutting insert 1 and have a size corresponding to the inclined part 3a. It should be noted that the inclined bottom wall surface 14a' is located closer to the inner periphery of the tool than the inclined bottom wall surface 14a". Further, the two inclined bottom wall surfaces 14a', 14a" substantially extend in the longitudinal direction of the tool body 12, i.e., a direction of the rotational axis RA. The bottom wall surface 14a faces forward in the rotating direction K. A screw hole 16, into which a fastening screw 15 for fixing the cutting insert 1 is to be inserted, is formed substantially at a center of the bottom wall surface 14a. The side wall surface 14b faces toward the leading end of the tool and has a shape and size which allow the side surface wall part 14b to come into contact with the flat surface of the second side surface part 4b which excludes the flank portion 4d in the cutting insert 1. It should be noted that the side wall surface 14b is provided in the vicinity of an outer peripheral surface of the tool.

Further, a chip pocket 17 for discharging chips produced through cutting is provided forward of each insert mounting seat 13 in the tool rotating direction K.

Figure 9:
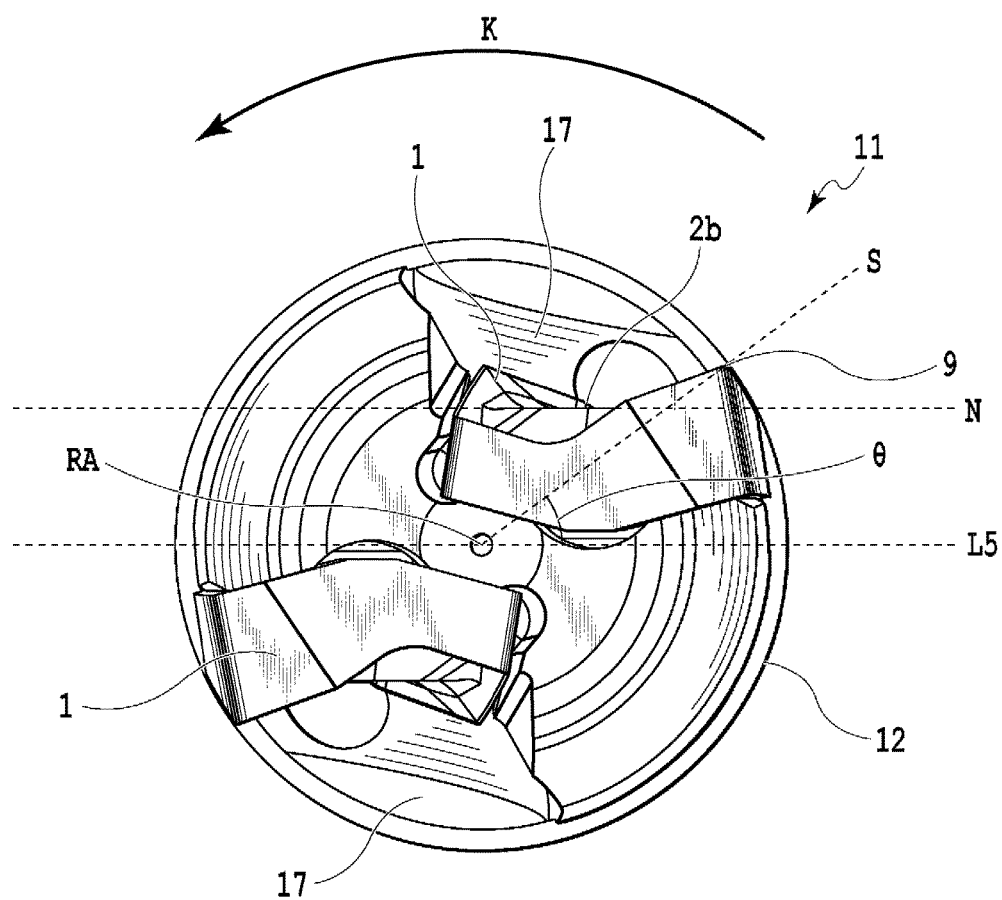
FIG. 9 is a leading end surface view of the indexable rotary cutting tool of FIG. 7.
Figure 10:
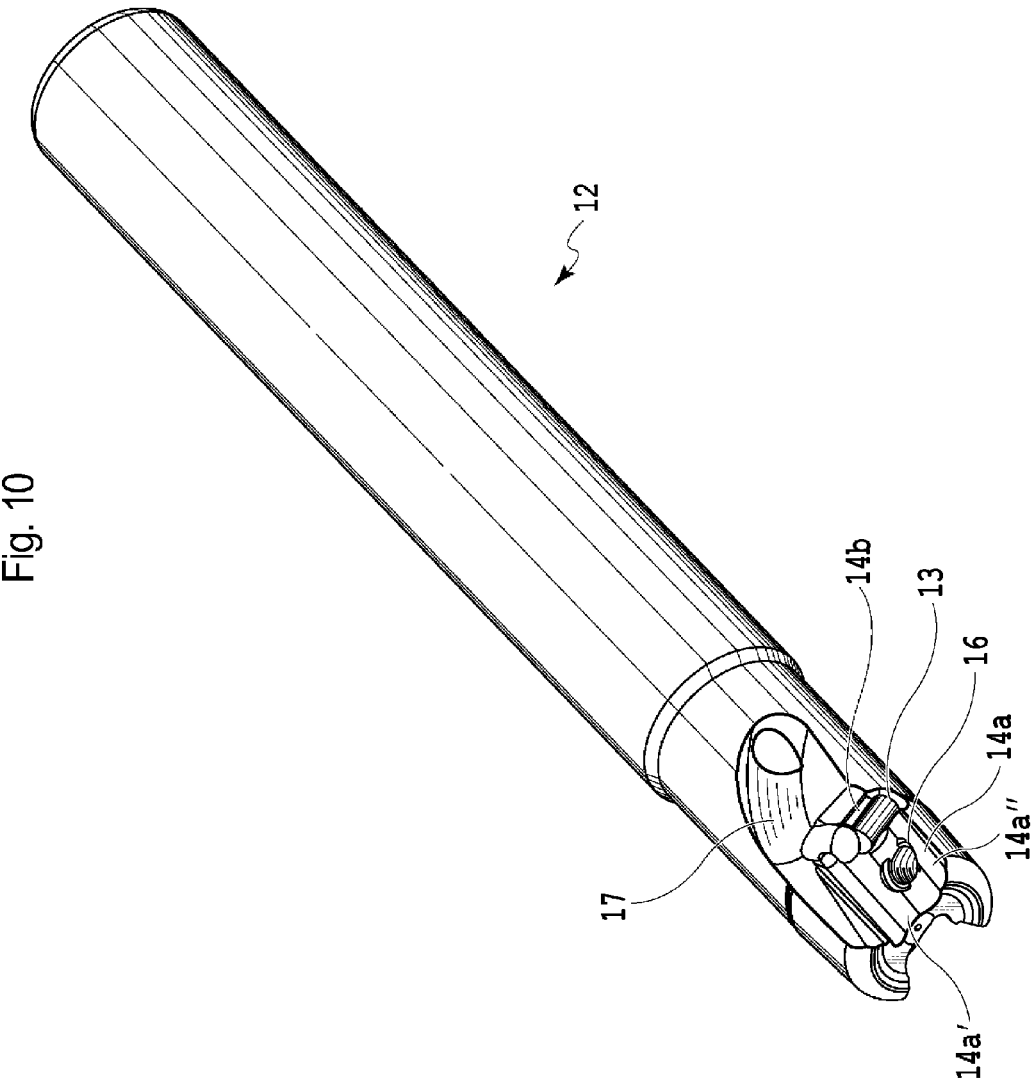
FIG. 10 is a perspective view of a tool body according to an embodiment of the present invention with regard to the cutting tool of FIG. 7.
Figure 11:
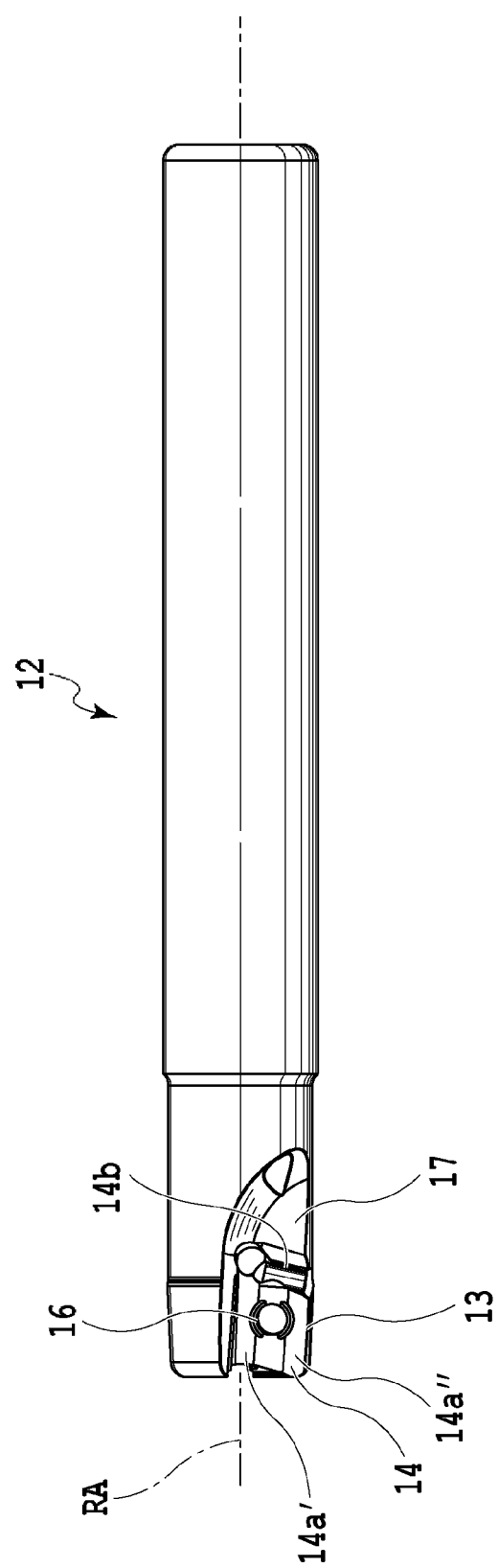
FIG. 11 is a side view of the tool body of FIG. 10.
Figure 12:
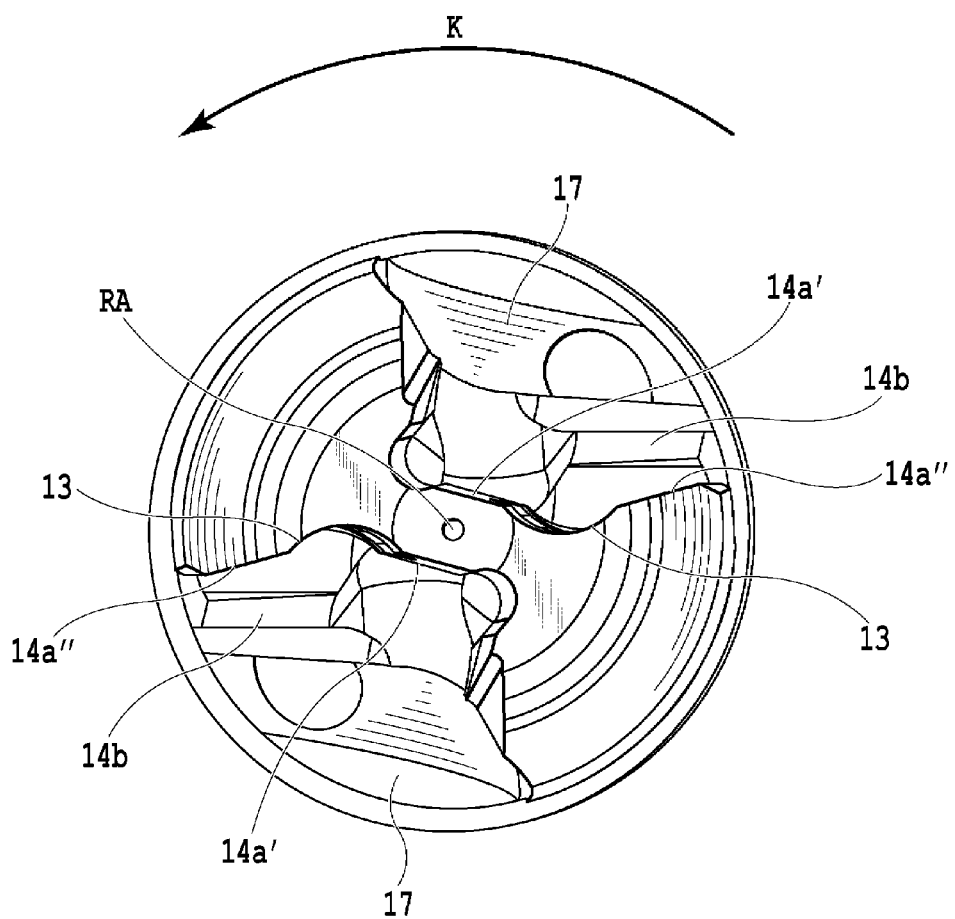
FIG. 12 is a leading end surface view of the tool body of FIG. 10.

The cutting insert 1 is removably mounted on the insert mounting seat 13 by screwing the fastening screw 15 into the screw hole 16 via the mounting hole 5. At this time, the cutting insert 1 itself is mounted on the tool body 21 such that a radial rake angle θ is −36°. Herein, as shown in FIG. 9, as viewed from the leading end surface side of the indexable rotary cutting tool 11, the radial rake angle θ refers to an intersection angle between a virtual plane L5, which is parallel to a virtual plane N along the top surface 2b of the first end surface 2 of the cutting insert 1 and passes through the rotational axis RA, and a radial rake angle plane S, which connects the rotational axis RA and an apex of the active corner cutting edge 9 involved in the cutting of the cutting insert 1. In FIG. 9, as to the radial rake angle θ, an angle when the radial rake angle plane S is located behind the virtual plane L5 in the tool rotating direction K is regarded as being positive. The angle of the radial rake angle θ is not limited to the above value but is preferably within a range of −40° or more and −30° or less. It should be noted that the angle of the radial rake angle is not limited thereto and may be changed as appropriate. Further, the cutting insert 1 itself is mounted on the tool body 12 such that an axial rake angle is 0°. It should also be noted that the angle of the axial rake angle is not limited thereto and may be changed as appropriate.

Figure 8:
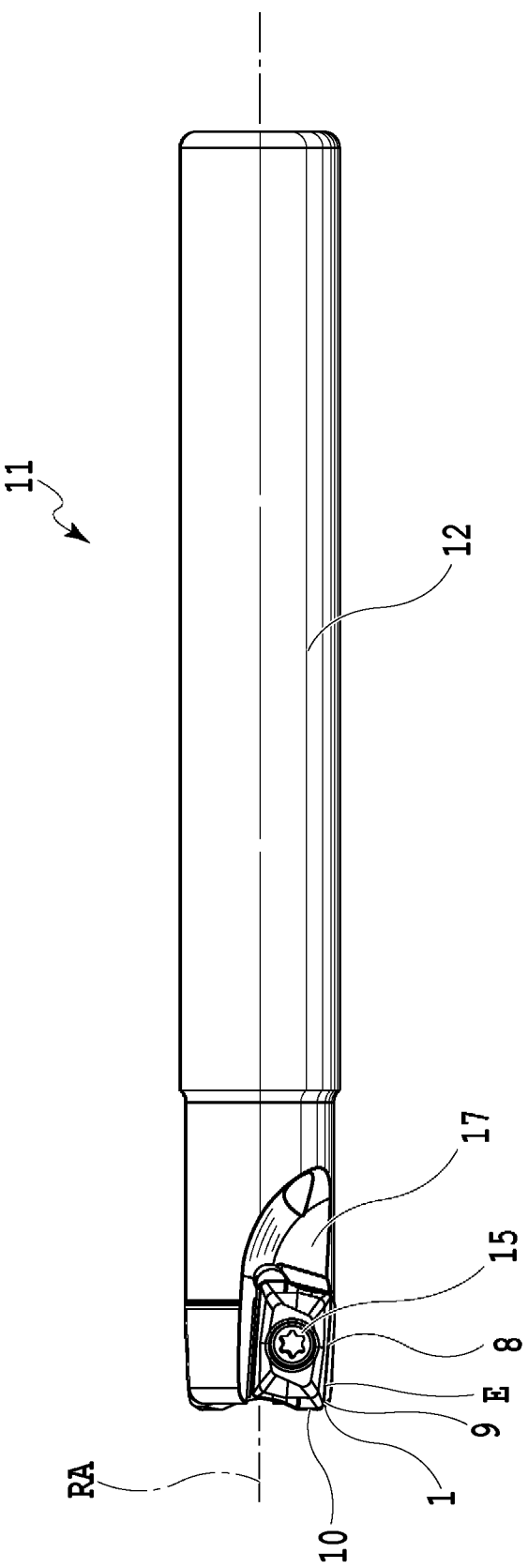
FIG. 8 is a side view of the indexable rotary cutting tool of FIG. 7.

In the cutting tool 11, the cutting insert 1 is arranged such that the active major cutting edge 8 extends substantially in the tool longitudinal direction, i.e., the direction of the rotational axis RA in FIG. 8. At this time, in FIG. 8, the active minor cutting edge 10 extends in a direction substantially orthogonal to the rotational axis RA, and the active corner cutting edge 9 is located on the leading end side of the tool and the outer periphery side thereof. In other words, the major cutting edge 8 of the active cutting edge extends, on the outer periphery side of the tool, substantially in the direction of the rotational axis RA, and an inclined part 3a", which is located on a back side of the major cutting edge 8 of the active cutting edge, is contacted by the outer-periphery-side inclined bottom wall surface 14a" of the bottom wall surface 14a of the insert mounting seat 13. Further, the first side surface part 4a related to the active major cutting edge gradually extends outward from the cutting insert (in particular, outward from the tool), heading from the first end surface to the second end surface. The inclined part 3a of the second end surface 3, which is located on a back side of the active cutting edge (in particular, the active major cutting edge), is inclined so as to become more distant from the first end surface in the direction of the axis O (insert thickness direction), heading from the first side surface part 4a related to the active major cutting edge to the central axis O.

Next, the operation and effects of the cutting insert 1 and the indexable rotary cutting tool 11 of the present embodiment will be described.

As described above, the cutting insert 1 is designed so as to be capable of being used for perpendicular shoulder milling. Thus, in the cutting with the indexable rotary cutting tool 11, the active cutting edge E can operate such that: the active major cutting edge 8 cuts a machined side surface of a workpiece; the active minor cutting edge 10 cuts a machined bottom surface of a workpiece; and the active corner cutting edge 9 cuts a corner located between a machined side surface of a workpiece and a machined bottom surface thereof. It should be noted that the indexable rotary cutting tool 11 can be configured for use as an end mill with a tool diameter of approximately 20 mm or less.

Figure 13:
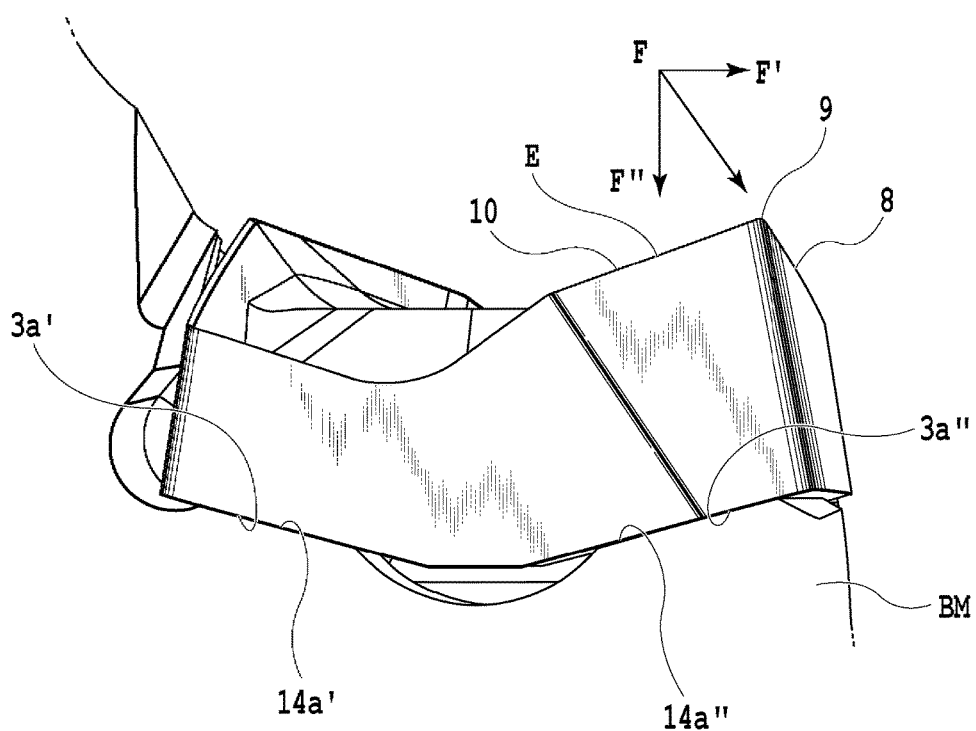
FIG. 13 is an enlarged view of a part in the vicinity of one cutting insert shown in FIG. 9.

In the cutting insert 1 of the present embodiment, the first side surface part 4a is formed so as to gradually become more distant from the virtual plane L2, outward from the cutting insert, heading from the first end surface 2 to the second end surface 3. In addition, each inclined part 3a is inclined so as to become more distant from the virtual plane L1, heading from the first side surface part 4a to the central axis O. As described above, by setting the clearance angle of the first side surface part 4a extending along the major cutting edge 8 so as to be negative, the inclined part 3a of the cutting insert 1 can have a significantly large area compared with the prior art. As a result, even if the situation occurs where some sort of factor causes, from among the two inclined parts 3a constituting a substantially V shape, the inclined part 3a' (see FIG. 13), which is located on the inner periphery side of the tool, to be distant from the inclined bottom wall surface 14a' (see FIG. 13) of the insert mounting seat 13, whereby the cutting insert 1 is supported only by the inclined part 3a" (see FIG. 13), which is located on the outer periphery side of the tool (while extending on a back side of the active major cutting edge 8), coming into contact with the outer-periphery-side inclined bottom wall surface 14a", the inclined part 3a" extending on the outer periphery side has a relatively wide area, and this makes it possible for such inclined part 3a" to sufficiently receive cutting resistance F (a component of force F', a component of force F"). In particular, as shown in FIG. 13, the significantly expanded inclined part 3a" makes it possible to sufficiently receive the component of force F', which is directed toward the outer periphery of the tool, of the cutting resistance F. Therefore, the fixing force of the cutting insert 1 is still significantly enhanced, even in the situation where the cutting insert 1 is supported by only the inclined part 3a". Further, in the direction of the application of the cutting resistance F itself, the bottom wall surface 14a" extends (is projected) to reach immediately below the active major cutting edge 8, and thus, the inclined bottom wall surface 14" can sufficiently receive the cutting resistance F itself, even in the situation where the cutting insert 1 is supported by only the outer-periphery-side inclined part 3a" coming into contact with the outer-periphery-side inclined bottom wall surface 14". Further, the inclined part 3a" having an expanded area allows the cutting resistance F to be dispersed widely, and this can suppress the elastic deformation of the back metal portion BM more effectively. The resultant synergistic effect increases the fixing force of the cutting insert, which makes it possible to significantly suppress the generation of chattering, etc.

Further, although the prior-art cutting insert of Patent Document 1 is of a positive type (in particular, the clearance angle of a side surface leading to a major cutting edge is positive), such cutting insert has the bottom surface having a V shape, and thus, the thickness around the mounting hole in the area near the lower surface of the cutting insert is extremely small compared with a normal positive-type cutting insert. Thus, such cutting insert 1 of Patent Document 1 has had a problem of reduction in the rigidity of the cutting insert itself. In contrast, in the cutting insert 1 of the present embodiment, by setting the clearance angle of the first side surface part 4a adjacent to the major cutting edge 8 so as to be negative, the thickness around the mounting hole 5 in the area close to the second end surface 3 can be made large while the second surface 3 has a substantially V shape, leading to the effect of suppressing the reduction in the rigidity of the cutting insert 1.

The cutting insert 1 of the present embodiment is a so-called 2-corner-available type which includes two cutting edges E each being comprised of a combination of the major cutting edge 8, the corner cutting edge 9 and the minor cutting edge 10. However, the present invention is not limited thereto, and any applicable cutting insert is only required to comprise at least one cutting edge. In that case, as long as the above configuration is achieved in at least one cutting edge, the above-mentioned effect can be achieved when such cutting edge is used, as an active cutting edge, for cutting. In other words, it is also possible to employ a configuration in which the flank 4a having a negative clearance angle and the inclined part 3a are formed only on the side where a cutting edge involved in cutting is formed.

The negative clearance angle β of the first side surface part 4a related to the major cutting edge is preferably within a range of −20° or more and −10° or less. This is because, when the negative clearance angle β of the first side surface part 4a is less than −20°, the first side surface part 4a may excessively be projected toward the outer periphery of the tool, and such projected portion may then strike a workpiece. Meanwhile, when the clearance angle β of the first side surface part 4a is more than −10°, the area of the inclined part 3a cannot be increased significantly, which makes it difficult to obtain the effect of fixing the cutting insert 1.

The clearance angle γ of the portion 4d, which functions as a flank, of the second side surface part 4b related to the minor cutting edge is preferably a positive angle. This is because the flank portion 4d adjacent to the minor cutting edge 10 involves a relatively small need to receive the cutting resistance F directed toward the outer periphery of the tool and also because, in the first place, the cutting resistance applied on the minor cutting edge 10 is lower than the cutting resistance applied on the major cutting edge 8. Therefore, the second side surface part 4b related to the minor cutting edge is not required to be inclined so as to be given a negative clearance angle, as opposed to the first side surface part 4a, and the clearance angle related to the minor cutting edge can be designed so as to be positive, giving priority to the improvement in the cutting ability of the minor cutting edge.

In the embodiment in which, as in the cutting insert 1 of the present embodiment, the two cutting edges E are formed so as to be of 180-degree rotational symmetry about the central axis O, the interior angle ε formed by the two inclined parts 3a of the second end surface 3 is preferably within a range of 140° or more and 160° or less. This is because, when the interior angle ε between the inclined parts 3a is less than 140°, the cutting insert 1 which has received cutting resistance may dig into the tool body 12 and, in turn, break the insert mounting seat 13. Meanwhile, when the interior angle ε between the inclined parts 3a is more than 160°, the second end surface 3 is comprised of an almost flat surface, which makes it difficult to obtain the effect of a V-shaped contact surface receiving cutting resistance.

Further, in the embodiment in which, as in the cutting insert 1 of the present embodiment, the two cutting edges E are formed so as to be of 180-degree rotational symmetry around the central axis O, it is preferable for the two first side surface parts 4a to have equal clearance angles β. This is because, when the clearance angles β of the two first side surface parts 4a are different from each other, the thickness around the mounting hole 5 of the cutting insert 1 will involve variations, corresponding to the respective major cutting edges 8, resulting in a rigidity imbalance of the cutting insert 1 in its entirety, and this may lead to the occurrence of unexpected fracturing, etc. For the same reason as above, it is preferable for the two inclined parts 3a to have equal inclination angles δ.

The cutting insert 1 itself is preferably mounted on the tool body 12 such that a radial rake angle is within a range of −40° or more and −30° or less. The mounting of the cutting insert 1 with a large negative radial rake angle allows a large area of the back metal portion of the tool body 12 to be secured. When the radial rake angle is less than −40°, this means a negatively large radial rake angle, leading to excessively high cutting resistance. Meanwhile, when the radial rake angle is more than −30°, it does not allow the back metal portion to be sufficiently secured.

Although representative embodiments of the present invention have been described above, the present invention is not limited to such embodiments, and various modifications may be made to the present invention. Various replacements and modifications of the present invention may be made without departing from the spirit and scope of the invention defined in the scope of the claims of the present application. The present invention includes modifications, applications and equivalents encompassed by the idea of the present invention defined by the scope of the claims.

What is claimed is:

1. A cutting insert (1) comprising a first end surface (2), a second end surface (3) opposing the first end surface (2) and a peripheral side surface (4) connecting the first end surface (2) and the second end surface (3), the cutting insert having an axis (O) penetrating the first end surface (2) and the second end surface (3), wherein:
    the first end surface (2) has a substantially quadrangular shape with four sides, including two long sides (7a) and two short sides (7b), and major cutting edges (8) being formed at the intersection of the first end surface (2) and the long sides (7a);
    the peripheral side surface (4) has two outwardly inclined first side surface parts (4a) associated with the two long sides (7a), and two second side surface parts (4b) associated with the two short sides (7b);
    the second end surface (3) has two inwardly inclined parts (3a), each connected to one of the two outwardly inclined first side surface parts (4a) and being inclined towards one another, each of the two inwardly inclined parts (3a) extending between the two short sides (7b) along a length of the second end surface (3);
    a vertical plane (P1) containing the axis (O) and intersecting the first and second end surfaces (2,3) passes between the two long sides (7a) such that the vertical plane (P1) does not intersect the two long sides (7a);
    the two outwardly inclined first side surface parts (4a) gradually become more distant from the vertical plane (P1), as they head from the first end surface (2) to the second end surface (3); and
    the two inwardly inclined parts (3a) gradually become more distant from the first end surface (2), as they head from respective outwardly inclined first side surface parts (4a) toward the vertical plane (P1),
    wherein the two outwardly inclined first side surface parts (4a) gradually become more distant from a first virtual plane (L2) in a direction outward from the axis (O) of the cutting insert (1), heading from the first end surface (2) to the second end surface (3),
    the two inwardly inclined parts (3a) are respectively directly connected to the two outwardly inclined first side surface parts (4a),
    the two inwardly inclined parts (3a) are configured to come into contact with a bottom wall surface (14a) of an insert mounting seat (13) provided in a tool body (12) when the cutting insert (1) is mounted in the insert mounting seat (13), and
    each of the two outwardly inclined first side surface parts (4a) lies entirely in a respective single plane inclined in one direction.

2. The cutting insert (1) according to claim 1, further comprising:
    a flat part (3b) connecting the two inwardly inclined parts (3a), the flat part (3b) extending along the vertical plane (P1) and being perpendicular thereto.

3. The cutting insert (1) according to claim 1, wherein in a cross-sectional view taken along a plane containing the axis (O) and perpendicular to the vertical plane (P1), the two outwardly inclined first side surface parts (4a) have a first clearance angle (β) from −20° to −10°.

4. The cutting insert (1) according to claim 1, wherein in a cross-sectional view taken in the vertical plane (P1), the second side surface parts (4b) have a positive clearance angle (γ).

5. The cutting insert (1) according to claim 1, wherein:
    the two inwardly inclined parts (3a) form a substantial V-shape with an interior angle (ε) of 140° to 160°.

6. The cutting insert (1) according to claim 1, wherein:
    in a cross-sectional view taken along a plane containing the axis (O) and perpendicular to the vertical plane (P1), the two outwardly inclined first side surface parts (4a) have a first clearance angle (β) from −20° to −10°;
    in a cross-sectional view taken in the vertical plane (P1), the second side surface parts (4b) have a positive second clearance angle (γ); and
    the substantial V-shape formed by the two inwardly inclined parts (3a) has an interior angle (ε) of 140° to 160°.

7. The cutting insert (1) according to claim 6, further comprising:

a flat part (3b) connecting the two inwardly inclined parts (3a), the flat part (3b) extending along the vertical plane (P1) and being perpendicular thereto.

8. An indexable rotary cutting tool (11), having a rotational axis (RA) and comprising:

a cutting insert (1) in accordance with claim 1;

the tool body (12) provided with the insert mounting seat (13); and the cutting insert (1) removably mounted in the insert mounting seat.

9. The indexable rotary cutting tool (11) according to claim 8, wherein:

an active major cutting edge of the major cutting edges (8) extends, on an outer periphery side of the tool, substantially along a direction of the rotational axis (RA); and a radial rake angle ($\theta$) of the active major cutting edge is from $-40°$ to $-30°$.

* * * * *